United States Patent [19]
Allen

[11] Patent Number: 4,882,658
[45] Date of Patent: Nov. 21, 1989

[54] HEADLAMP ASSEMBLY

[75] Inventor: Alfred M. Allen, Palm Harbor, Fla.

[73] Assignee: General Motors Corporation, Detroit, Mich.

[21] Appl. No.: 237,802

[22] Filed: Aug. 29, 1988

[51] Int. Cl.$^4$ .............................................. B60Q 1/00
[52] U.S. Cl. ..................................... 362/61; 362/289; 362/69; 362/428; 362/430; 362/275
[58] Field of Search .................. 362/61.66, 80, 269, 362/270, 273, 275, 285, 287, 289, 418, 419, 421–425, 427–430

[56] References Cited

U.S. PATENT DOCUMENTS

| | | | |
|---|---|---|---|
| 4,574,334 | 3/1986 | Igura | 362/430 |
| 4,689,725 | 8/1987 | Saijo et al. | 362/289 |
| 4,707,771 | 11/1987 | van Duyn et al. | 362/427 |
| 4,742,435 | 5/1988 | van Duyn et al. | 362/289 |
| 4,757,428 | 7/1988 | Ryder et al. | 362/428 |
| 4,761,717 | 8/1988 | McMohan et al. | 362/420 |
| 4,774,639 | 9/1988 | Bower et al. | 362/419 |

FOREIGN PATENT DOCUMENTS 0129519 12/1984 European Pat. Off. .............. 362/69

*Primary Examiner*—Ira S. Lazarus
*Assistant Examiner*—Diana M. Cox
*Attorney, Agent, or Firm*—Edward J. Biskup

[57] ABSTRACT

A headlamp assembly which includes a lamp body for adjustable movement about a aim axis and in which such movement is realized through a rotatable wheel accessible from above the headlamp assembly and which is rotatable about an axis normal to the aim axis and forms a part of a spur gear arrangement for realizing the adjustment of the lamp body.

6 Claims, 2 Drawing Sheets

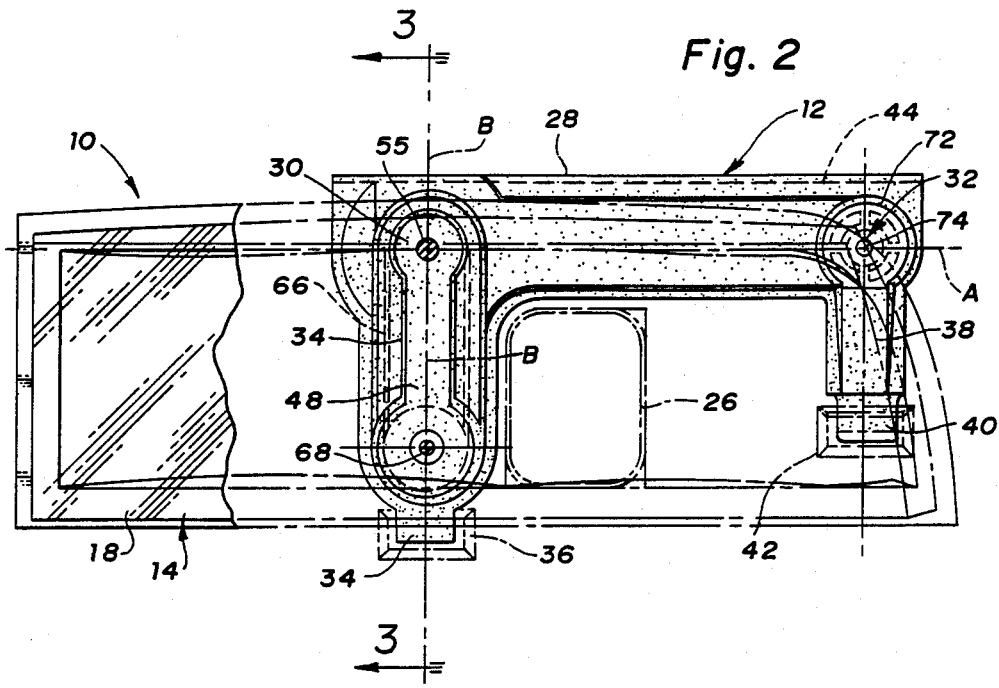
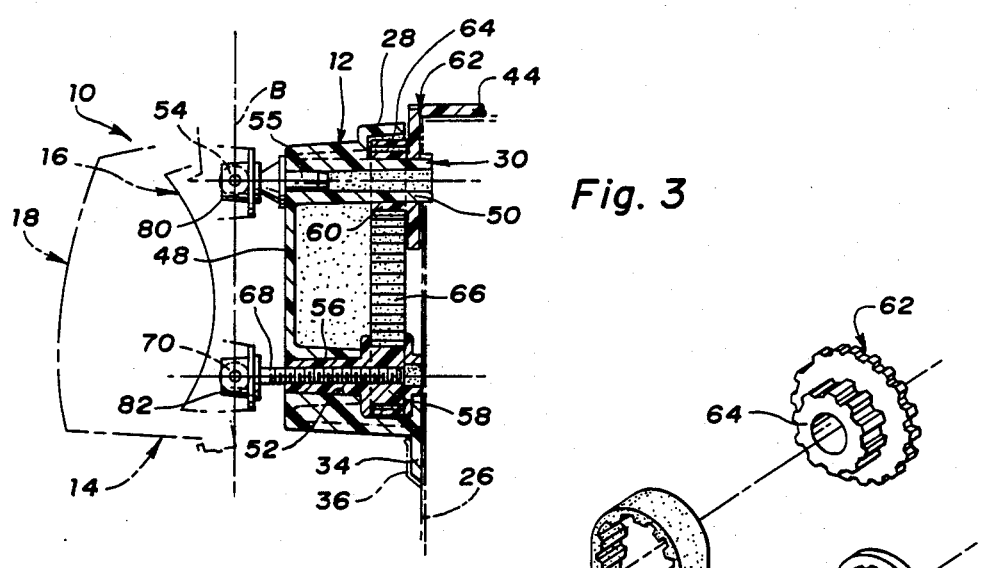
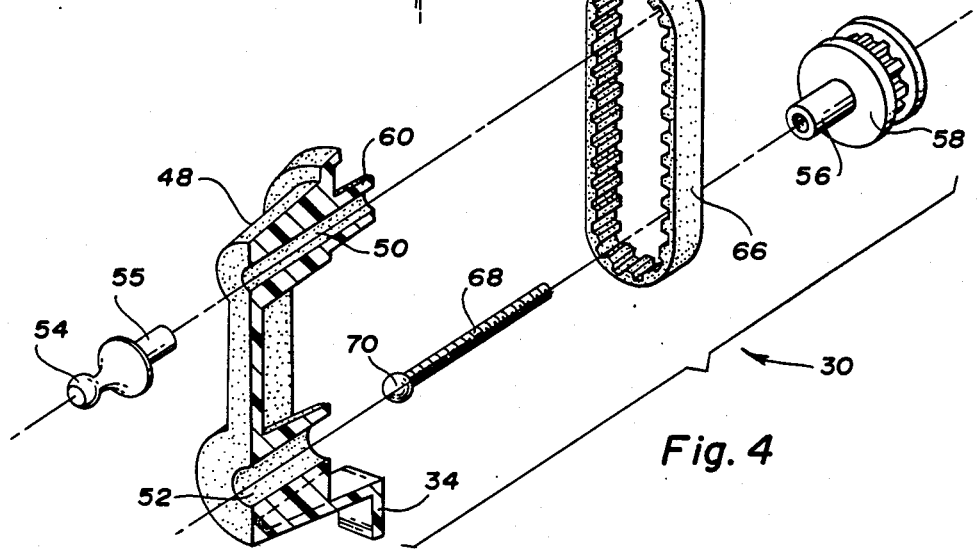

HEADLAMP ASSEMBLY

The invention concerns vehicle headlamps and more particularly an adjusting mechanism for such headlamps that allows the position of the headlamp to be adjusted by means accessible from above the headlamp.

The patent to Van Duyn et al U.S. Pat. No. 4,742,435, which is assigned to the assignee of this invention, discloses a headlamp assembly which includes a stanchion that serves to facilitate attachment of a lamp body of the composite type to the front end of a vehicle and allows selective adjustable movement of the lamp body about a vertical aim axis and a horizontal aim axis. The stanchion supports an adjustment mechanism which includes a pair of orthogonally arranged shafts which are interconnected by a pair of bevel gears in a gear housing so that upon rotation of a vertically orientated shaft, a drive nut is rotated resulting in longitudinal movement of a horizontally orientated shaft for adjusting the position of the lamp body about a horizontal aim axis.

The present invention concerns a headlamp assembly that is similar to the above described headlamp assembly in that it also allows the lamp body to be adjusted from above the headlamp assembly. However, the present invention differs from the above described lamp assembly in that the adjustment of the lamp body about the aim axis is realized by rotating a thumb wheel journaled on an axis which is normal to the horizontal aim axis about which the lamp unit is tiltable. In addition, the thumb wheel is connected to the longitudinally movable shaft through a spur gear arrangement carried by a support bracket.

More specifically, the headlamp assembly according to the present invention incorporates a lamp body that is selectively adjustable about a vertical aim axis and a horizontal aim axis and is carried by a mounting bracket adapted to be fixedly secured to the front end of a vehicle. The mounting bracket supports a first longitudinally adjustable ball pivot connected to the lamp body along the horizontal aim axis and also supports a second longitudinally adjustable ball pivot connected to the lamp body along the vertical aim axis. In addition, the mounting bracket has a fixed ball pivot which is connected to an upper portion of the lamp body at the intersection of the vertical aim axis and the horizontal aim axis. Each of the adjustable ball pivots is rigidly formed with a threaded shaft which is adjustable longitudinally by rotating a thumb wheel about an axis perpendicular to the horizontal aim aixs. In the preferred form, the thumb wheel associated with the first adjustable ball pivot is formed with a spur gear arrangement which includes a drive spur gear mounted on the mounting bracket to the rear of the fixed ball pivot. The drive gear is connected through a belt to a driven gear formed with a hub that threadably engages the threads of the associated threaded shaft fixed to the first adjustable ball pivot. Thus, by rotating the thumb wheel, the drive gear causes rotation of the driven gear resulting in longitudinal repositioning of the first ball pivot so that the lamp body is adjusted about the horizontal aim axis. Adjustable positioning of the lamp body about the vertical aim axis is realized by having the threaded shaft of the second ball pivot directly fixed with the associated thumb wheel and threadably received by the support bracket. Thus, by rotating the latter mentioned thumb wheel, the associated screw shaft will be threaded into or out of the support bracket and cause the lamp body to be adjusted about the vertical aim axis.

The objects of the present invention are to provide a new and improved headlamp assembly including a lamp body carried for adjustable movement about a horizontal aim axis and in which such adjustment is realized through a thumb wheel accessible from above the headlamp assembly and that is rotatable about an axis substantially normal to the horizontal aim axis and is connected through a spur gear arrangement to a longitudinally movable ball pivot; to provide a new and improved adjustment mechanism for a headlamp assembly that includes a lamp body carried through a pair of vertically spaced ball pivots one of which is fixed in position on a mounting bracket and the other of which is longitudinally movable for adjusting the position of the headlamp through a thumb wheel that is connected through a belt drive to the movable ball pivot; and to provide a new and improved adjustment mechanism for providing longitudinal movement of a ball pivot connected to a lamp body at a lower portion thereof and including a thumb wheel located above the ball pivot and connected through a spur gear arrangement that includes a drive gear, an idler gear and a driven gear and is connected to a threaded shaft fixed with the ball pivot for causing longitudinal movement of the latter upon rotation of the thumb wheel.

Other objects and advantages of the present invention will be more apparent from the following detailed description when taken with the drawings in which FIG. 1 is a plan view of a headlamp assembly made in accordance with the present invention having certain parts broken away so as to be more clearly show the construction of the invention;

FIG. 2 is an elevation view of the headlamp assembly of FIG. 1 taken on line 2—2 with a major portion of the lamp body shown in phantom lines so as to reveal the construction of the mounting bracket which forms a part of the headlamp assembly;

FIG. 3 is a sectional view taken on line 3—3 of FIG. 2 showing one of the adjustment mechanisms incorporated with the headlamp assembly; and FIG. 4 is an exploded perspective view showing the parts of the adjustment mechanism shown in FIG. 3.

Figure 1:
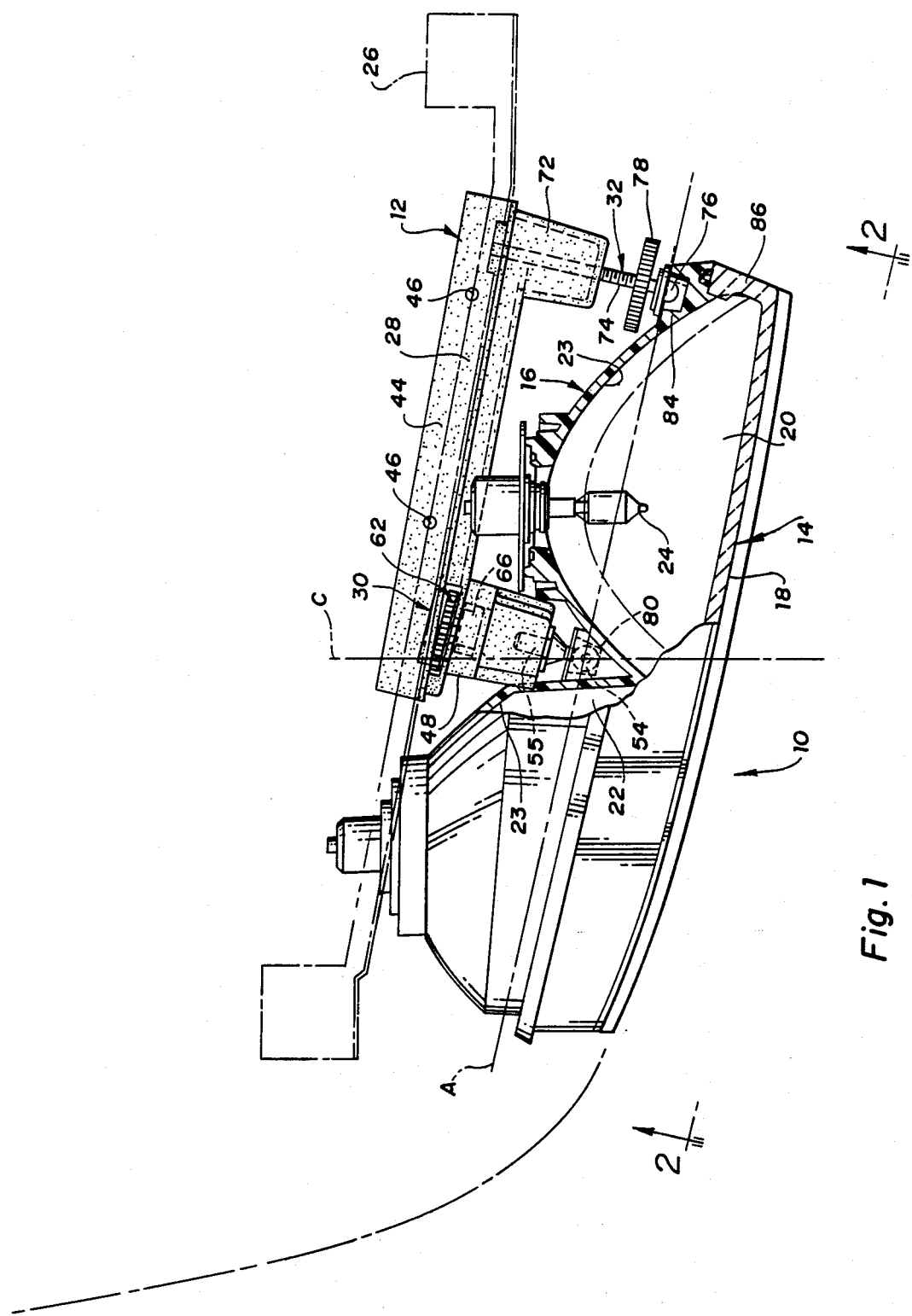

Referring now to the drawings and more particularly FIG. 1 thereof, a headlamp assembly 10 is shown of the replaceable light bulb composite type made in accordance with the present invention. The headlamp assembly 10 includes a mounting bracket 12 which carries a lamp body 14 for selective adjustable movement in a horizontal plane containing a horizontal aim axis A and in a vertical plane containing a substantially vertical aim axis B. The lamp body includes a plastic reflector member 16 enclosed by a glass or the like lens 18 and formed with a pair of side by side parabolic cavities 20 and 22 the concave surfaces 23 of each of which is aluminized so as to project a light beam emanating from an associated replaceable light bulb 24 forwardly and substantially parallel to an axis C. It will be noted that as shown in FIG. 1, the axis C is parallel to the longitudinal center axis of the vehicle and the headlamp assembly 10 would be the left hand unit when looking towards the front of the vehicle as seen in FIG. 2. As should be apparent, the angled position of the headlamp assembly 10 is due to the rounded streamline front end design which is currently popular with motor vehicles. Also each light bulb 24 in the cavities is provided with a single filament located so as to cause the associated parabolic surface to project a light beam forwardly of the vehicle. The light bulb in the cavity 22 allows the associated aluminized parabolic surface 23 to project a so-called "low beam" when energized while the light bulb in the cavity 20 will project the so-called "high beam" when energized. Thus, the lamp body 14 is actually two separate headlamps, a low beam unit and a high beam unit, joined together so as to facilitate aiming adjustment of both lamps.

The mounting bracket 12 is made of a plastic material and is adapted to be secured to the sheet metal 26 of the motor vehicle at the front end thereof and, in its preferred form, has a main body portion 28 that is generally L-shaped as seen in FIG. 2 and includes a pair of laterally spaced adjustment mechanisms 30 and 32 for positioning the lamp body 14 about the aforementioned aim axes. The adjustment mechanism 30 is located within the vertical leg portion of the mounting bracket 12 while the adjustment mechanism 32 is located at the terminal end of the horizontal leg portion of the mounting bracket 12. It will be noted that the lower end of the vertical leg portion is formed with an integral downwardly extending tab 34 which is received within a pocket 36 provided in the sheet metal 26 of the vehicle. Similarly, the terminal end of the horizontal leg portion has an integral depending foot 38 which is formed with a tab 40 that is received by a pocket 42 provided in the sheet metal 26 of the vehicle. In addition, the horizontal leg portion of the mounting bracket, as seen in FIG. 1, has an integral rearwardly extending flange 44 which allows the top portion of the mounting bracket 12 to be secured to the vehicle sheet metal 26 by use of threaded fasteners or the like which extend through a pair of circular apertures 46 formed in the flange 44.

As best seen in FIGS. 1, 3, and 4 the adjustment mechanism 30 is located within a housing 48 which projects forwardly outwardly from and is integral with the vertical leg portion of the mounting bracket 12. The upper and lower portions of the housing 48 are formed with through bores 50 and 52, the former of which has a ball pivot 54 with integral stud 55 press-fitted therein while the latter serves to rotatably accommodate a stub shaft 56 fixed to a driven spur gear member 58. In addition, the upper portion of the housing is formed with an integral cylindrical bearing member 60 which rotatably receives a thumb wheel member 62. The thumb wheel member 62 has a drive spur gear member 64 fixed thereto which is drivingly connected to the driven gear member 58 by a drive belt 66 having spur gear teeth formed on the inner surface thereof which mesh with the gear teeth of the driven gear member 58 and the drive gear member 64. Thus, when the thumb wheel member 62 is rotated in one direction or the other, the drive gear 64 causes the belt 66 to rotate the driven gear 58 in a corresponding direction. In this regard, it will be noted that the stub shaft 56 and gear member 58 have a threaded bore formed therein which threadably engages the threads formed on the entire length of a screw shaft 68 the front end of which is fixed to a ball pivot 70. The ball pivot 70 is restrained from rotation about the longitudinal center axis of the shaft 68 so that, when the driven gear 58 is rotated, the ball pivot 70 will move longitudinally fore and aft causing repositioning of the ball pivot 70 and adjustment of the lamp body 14 as will be more fully explained hereinafter.

The other adjustment mechanism 32 is carried by an enlarged section 72 integral with and extending forwardly from the terminal end of the horizontal leg portion of the mounting bracket 12. In this case, a shaft 74, which also has its entire length formed with threads, is integrally formed with a ball pivot 76 located at the front end thereof is threadably received by the enlarged section 72. Also, a thumb wheel member 78 is fixed to the shaft 74 adjacent the ball pivot 76 so that upon rotation of the thumb wheel member 78, the shaft 76 will move into or out of the enlarged section 72 depending upon the direction of the rotation of the thumb wheel member 78 and cause longitudinal movement of the ball pivot 76.

As alluded to hereinbefore, the mounting bracket 12 carries the lamp body 14 for adjustable movement about the aim axes A and B. In this regard and as seen in FIGS. 1 through 3, the ball pivots 54, 70 and 76 incorporated with the mounting bracket 12 serve to support the lamp body 14 for adjustable movement about the aim axis A which passes through the centers of the ball pivots 54 and 76 And also about the aim axis B which passes through the centers of the ball pivots 54 and 70. The ball pivot 54 is received within a plastic socket 80 snapped into and maintained within a square aperture formed in an upper portion of the reflector member 16 between the cavities 20 and 22. The ball pivot 70 fixed with the shaft 68 is also received by a plastic socket 82 which is snapped into and maintained within a square aperture located at a lower portion of the lamp body 14. In the case of the socket 82, however, the ball pivot 70 is maintained therein so that it is non-rotatable about the longitudinal axis of the associated shaft 68. Finally, it will be noted that the ball pivot 76 is located within a plastic socket 84 located in a square aperture formed in the reflector member 16 at the upper portion thereof and adjacent the inner side 86 of the lens 18.

As should be apparent, the lamp body 14 and the mounting bracket 12 can be preassembled so when the headlamp assembly 10 arrives at a vehicle assembly plant, the headlamp assembly 10 can be mounted on the vehicle as a unit. On the other hand, if need be, the lamp body 14 and the mounting bracket 12 can be shipped as individual parts and quickly assembled at the plant by merely having the ball pivots 54, 70 and 76 snapped into the accommodating sockets 80, 82 and 84 in the lamp body 14. In either case, once the lamp body 14 is assembled to the mounting bracket 12, the latter will be secured to the vehicle by first positioning the tabs 34 and 40 within the accommodating pockets 36 and 42 respectively and afterwards securing the flange 44 to the sheet metal of the vehicle body. The proper aim of the lamp body 14 can subsequently be realized by rotating the thumb wheel members 62 to position the lamp body 14 about the horizontal aim axis A and by rotating the other thumb wheel member 78 to position the lamp body about the vertical aim axis B.

Although not shown, it should be apparent that rather than utilizing the belt 66 between the drive gear 64 and the driven gear 58, an idler gear could be rotatably supported by the housing 48 between the two gears 64 and 58 to similarly accomplish longitudinal movement of the shaft 68.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A headlamp assembly adapted to be mounted on the front end of a motor vehicle and having a lamp body for selective adjustment about an aim axis, said headlamp assembly including a mounting bracket adapted to be fixedly secured to said front end of said motor vehicle, said mounting bracket supporting a longitudinally adjustable ball pivot connected to said lamp body along said aim axis and movable along a first axis substantially perpendicular to a vertical plane passing through said aim axis, a fixed ball pivot supported by said bracket and connected to said lamp body and located above said longitudinally adjustable ball pivot, said longitudinally adjustable ball pivot having a threaded shaft fixed thereto, a drive spur gear mounted on said bracket to the rear of said fixed ball pivot for rotation about a second axis vertically spaced from and substantially parallel to said first axis, a driven spur gear connected to said shaft of said adjustable ball pivot so as to cause longitudinal movement of the latter along said first axis upon rotation of said driven gear, means connecting said drive gear to said driven gear so that rotation of said drive gear causes rotation of said driven gear with resultant movement of said lamp body about said aim axis.

2. A headlamp assembly adapted to be mounted on the front end of a motor vehicle and having a lamp body for selective adjustment about an aim axis, said headlamp assembly including a mounting bracket adapted to be fixedly secured to said front end of said motor vehicle said mounting bracket supporting a longitudinally adjustable ball pivot connected to said lamp body below said aim axis, a fixed ball pivot supported by said bracket and connected to said lampo and located above said longitudinally adjustable ball pivot, said longitudinally adjustable ball pivot having a threaded shaft fixed thereto, a drive spur gear mounted on said bracket to the rear of said fixed ball pivot for rotation about an axis substantially perpendicular to said aim axis, a wheel fixed to said drive gear, a driven spur gear connected to said shaft of said adjustable ball pivot so as to cause longitudinal movement of the latter upon rotation of said driven gear, a belt connecting said drive gear to said driven gear so that rotation of said causes rotation of said driven gear with resultant movement of said lamp body about said aim axis.

3. A headlamp assembly adapted to be mounted on the front end of a motor vehicle and having a lamp body for selective adjustment about a horizontal aim axis and a vertical aim axis, said headlamp assembly including a mounting bracket adapted to be fixedly secured to said front end of said motor vehicle, said mounting bracket supporting a first longitudinally adjustable ball pivot connected to said lamp body along said horizontal aim axis, a second longitudinally adjustable ball pivot supported by said mounting bracket and connected to said lamp body along said vertical aim axis and movable along a first axis substantially perpendicular to said vertical aim axis, a fixed ball pivot supported by said bracket and connected to said lamp body and located above said second adjustable ball pivot at the intersection of said horizontal aim axis and said vertical aim axis, said first and second longitudinally adjustable ball pivots each having a threaded shaft fixed thereto, a drive spur gear mounted on said bracket to the rear of said fixed ball pivot for rotation about a second axis vertically spaced from and substantially parallel to said first axis, a driven spur gear connected to said shaft of said second adjustable ball pivot so as to cause longitudinal movement of the latter along said first axis upon rotation of said driven gear, means connecting said drive gear to said driven gear so that rotation of said drive gear causes rotation of said driven gear with resultant movement of said headlamp about said horizontal aim axis.

4. The headlamp assembly of claim 3 wherein said means connecting said drive gear to said driven gear is an idler gear.

5. The headlamp assembly of claim 3 wherein said second longitudinally adjustable ball pivot is located in a housing projecting outwardly from said mounting bracket.

6. The headlamp assembly of claim 5 wherein said drive gear is fixed to a wheel member supported by rotation by said housing.

* * * * *